United States Patent
Crapet

(10) Patent No.: US 11,478,067 B2
(45) Date of Patent: Oct. 25, 2022

(54) APPLICATOR FOR COSMETIC PRODUCT, IN PARTICULAR MASCARA, ASSOCIATED APPLICATOR UNIT AND METHOD FOR MANUFACTURING SUCH AN APPLICATOR

(71) Applicant: Albea Services, Gennevilliers (FR)

(72) Inventor: Yann Crapet, Fremecourt (FR)

(73) Assignee: Albea Services, Gennevilliers (FR)

(*) Notice: Subject to any disclaimer, the term of this patent is extended or adjusted under 35 U.S.C. 154(b) by 263 days.

(21) Appl. No.: 16/679,287

(22) Filed: Nov. 11, 2019

(65) Prior Publication Data

US 2020/0146429 A1 May 14, 2020

(30) Foreign Application Priority Data

Nov. 9, 2018 (FR) .................................... 1860348

(51) Int. Cl.
  *A46B 9/02* (2006.01)
  *A46B 3/00* (2006.01)
  *B33Y 80/00* (2015.01)
  *A45D 40/26* (2006.01)
  *B29L 31/00* (2006.01)

(52) U.S. Cl.
  CPC .............. *A46B 9/021* (2013.01); *A46B 3/005* (2013.01); *A46B 9/028* (2013.01); *A45D 40/265* (2013.01); *A46B 2200/1053* (2013.01); *B29L 2031/718* (2013.01); *B33Y 80/00* (2014.12)

(58) Field of Classification Search
  CPC ......... A46B 9/021; A46B 9/025; A46B 9/028; A46B 3/005; A46B 9/06; A45D 40/262; A45D 40/265
  See application file for complete search history.

(56) References Cited

U.S. PATENT DOCUMENTS

| 8,794,247 | B2 * | 8/2014 | Kulik ...................... A46B 9/025 132/218 |
| 2008/0219748 | A1 | 9/2008 | Salciarini |
| 2010/0071715 | A1 * | 3/2010 | Bickford ................ A46B 9/021 132/218 |

FOREIGN PATENT DOCUMENTS

| FR | 2937514 | 4/2010 |
| FR | 2982466 | 5/2013 |

* cited by examiner

*Primary Examiner* — Shay Karls
(74) *Attorney, Agent, or Firm* — CRGO Global; Steven M. Greenberg

(57) ABSTRACT

An applicator for cosmetic product includes a core extending along a longitudinal extension direction, also called a main direction, and one or more protrusions integral with the core. The protrusions extend from a proximal end connected to the core to a distal free end along a elongation direction, so as to define a length. At least some of the protrusions have at least one helicoidal winding on at least a portion of the length thereof, called helicoidal winding portion.

9 Claims, 8 Drawing Sheets

APPLICATOR FOR COSMETIC PRODUCT, IN PARTICULAR MASCARA, ASSOCIATED APPLICATOR UNIT AND METHOD FOR MANUFACTURING SUCH AN APPLICATOR

CROSS REFERENCE TO RELATED APPLICATIONS

This application claims priority under 35 U.S.C. § 119(a) to French patent application number 1860348, filed on Nov. 9, 2018, the entire teachings of which are incorporated herein by reference.

BACKGROUND OF THE INVENTION

Field of the Invention

The invention concerns an applicator for cosmetic product, in particular mascara, and an associated applicator unit. The invention furthermore concerns a method for the manufacturing of such an applicator

Description of the Related Art

Mascara applicators can be obtained from fibrous elements maintained between the longitudinal portions of a twisted metal pin; they are thus commonly called "twisted brushes". The ends of the fibrous elements usually form envelopes along a longitudinal extension direction of the brush. The twisted brushes have, via their manufacturing method, a cylindrically-shaped envelope which offers not very many options in terms of make-up effects. Numerous solutions have already been proposed to give varied shapes to twisted brushes.

Mascara applicators can also be obtained by injection molding of plastic material, they are thus commonly called "plastic brushes". Thus, plastic brushes can have original shapes in order to propose particular make-up effects.

However, there is still a need to improve mascara applicators, in particular to obtain applicators ensuring a sufficient load of cosmetic product and a good return of it, while conserving a flexibility of application of the cosmetic product.

BRIEF SUMMARY OF THE INVENTION

The invention concerns an applicator for cosmetic product, including a core extending along a longitudinal extension direction X, called main direction, and a plurality of protrusions integral with the core, the protrusions extending from a proximal end connected to the core towards a free distal end along an elongation direction so as to define a length.

According to the invention, at least some of the protrusions have at least one helicoidal winding on at least one portion of the length thereof, called helicoidal winding portion.

In other words, some or all of the protrusions have a helicoidal profile over all or some of the length thereof.

This specific profile of the protrusions, advantageously makes it possible to increase the length of the protrusion and to create a flexibility effect during the application of make-up.

In addition, the helicoidal winding provides improved coverage of the surfaces on which make-up is applied, and therefore a better distribution of the cosmetic product. Eyelashes, in particular, are housed in the furrow created by the helicoidal shape of the protrusions, which develops the upper and lower surfaces of the eyelashes, as well as the sides thereof.

Finally, the formation of the furrow creates a zone of storage for the cosmetic product. The applicator thus has a significant load of cosmetic product, allowing putting on make-up over the entire surface, and even on several surfaces, in one single application.

According to different embodiments, which can be taken together or separately:
- the helicoidal winding has at least one turn,
- protuberances protrude from the core,
- the protuberances are arranged all around the periphery of the core,
- the protuberances have a tapered profile,
- all the protrusions have a helicoidal winding,
- the at least one helicoidal winding is situated on a portion radially distal from the protrusions,
- the at least one helicoidal winding extends over at least ¼ of the length of the protrusions, or even over at least ⅓, ½, ⅔, ¾, of the length of the protrusions,
- the at least one helicoidal winding extends over the whole length of the protrusions,
- the protrusions include at least one groove,
- the groove extends parallel to the at least one helicoidal winding,
- the groove extends by winding around the protrusion,
- the transversal cross-section of the protrusions has at least one groove, or even two, or even three, or even four grooves,
- the protrusions are arranged in the form of longitudinal rows, the rows being substantially parallel to the main direction X,
- the protrusions are arranged in the form of longitudinal rows, the rows winding helicoidally around the core,
- the applicator is obtained by additive manufacturing.

The invention also concerns an applicator unit for cosmetic product, including:
- a container including a body forming a reservoir intended to contain the cosmetic product, and
- an applicator of the cosmetic product such as defined above, adapted to be fixed on the container, such that the applicator is housed inside the reservoir.

The invention finally concerns a method for manufacturing an applicator for cosmetic product, in particular mascara, such as defined above. The method includes:
- a step of developing a digital model of the applicator;
- a step of manufacturing the applicator by means of the digital model.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
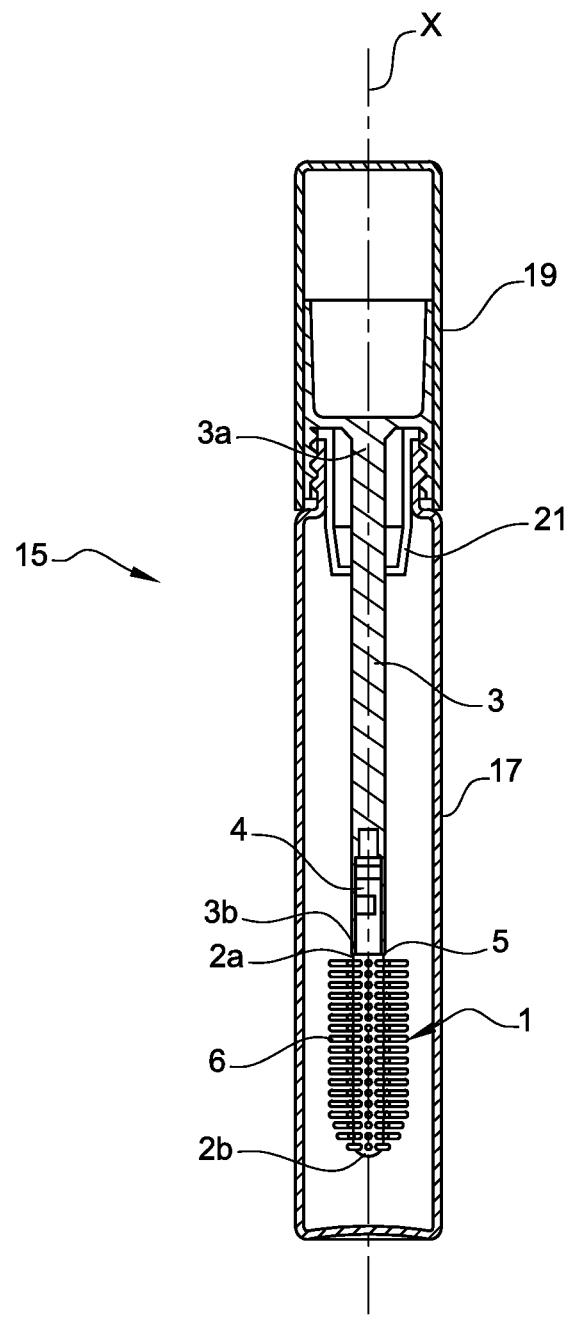
FIG. 1 is a cross-sectional view of an example of an applicator unit according to the invention.
Figure 2:
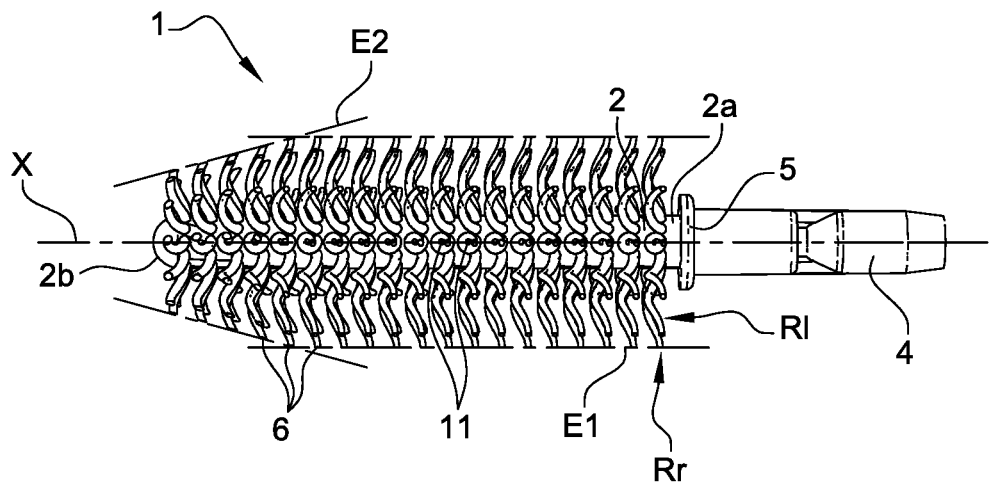
FIG. 2 is a side view of an applicator according to a first embodiment.
Figure 3:
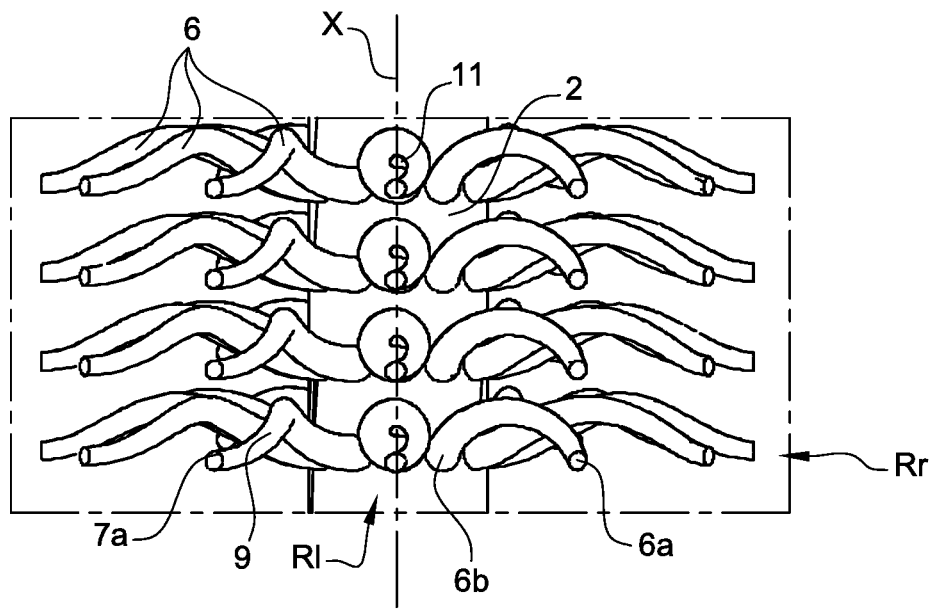
FIG. 3 is a detailed view of the protrusions of the applicator of FIG. 2.
Figure 4:
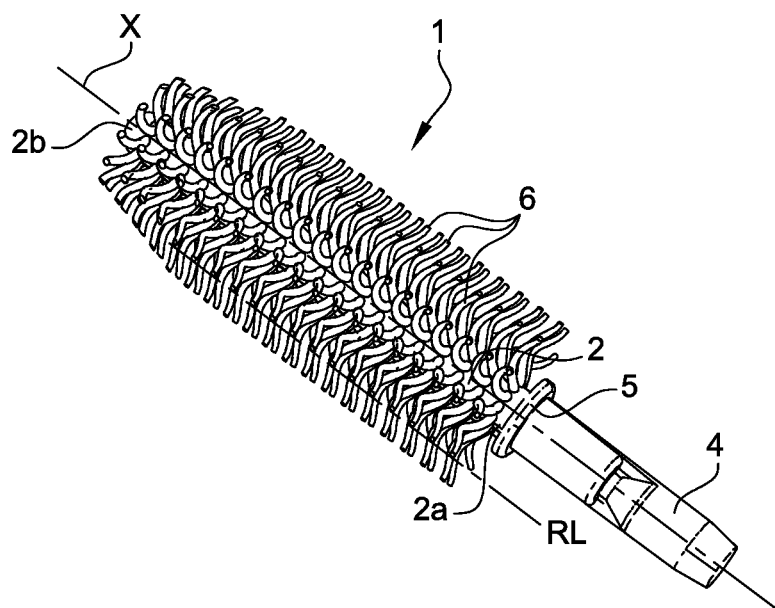
FIG. 4 is a perspective view of the applicator of FIG. 2.

As illustrated in FIG. 1, the invention concerns an applicator 1 for cosmetic product, in particular for mascara, including a core 2 extending along a longitudinal extension direction, called main direction and referenced X in FIG. 1.

The core 2 has a first end 2a, also called proximal end, capable of being fixed to an applicator 1 rod 3 by a sleeve 4 extending the core 2, and a second free end 2b, also called distal end, opposite the first end 2a along the main direction X. Conventionally, the sleeve 4 extends from a stop ring 5.

The applicator 1 further includes a plurality of protrusions 6 integral with the core 2. The core 2 and the protrusions 6 are thus made of one single part. It must be noted, that the sleeve 4 is devoid of protrusions 6.

The protrusions 6 protrude from the core 2.

Advantageously, the protrusions 6 are arranged all around the periphery of the core 2.

In the embodiments shown in the figures, the protrusions 6 protrude from the core 2 in a direction that is substantially perpendicular to the main direction X, called radial direction.

In other embodiments (not shown) the protrusions 6 can protrude from the core 2 by forming an angle with the main axis X that is not 90°. In other words, the protrusions 6 can be at an angle towards the second end 2b of the core 2, or at an angle towards the first end 2a of the core 2.

Advantageously, the protrusions 6 have a tapered profile.

The protrusions 6 extend from a proximal end 6b connected to the core 2 towards a free distal end 6a along a elongation direction so as to define a height H and a length L.

Figure 5:
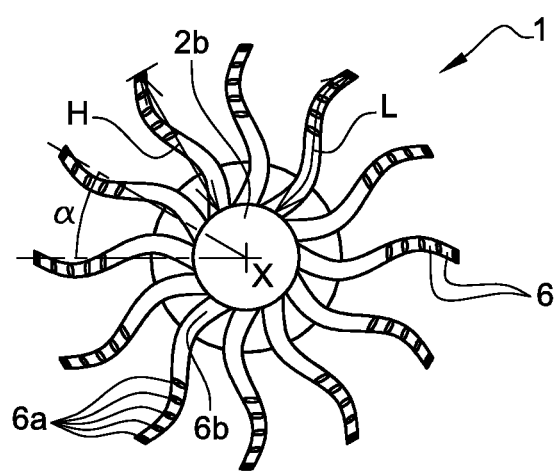
FIG. 5 is a top view of the applicator of FIG. 2.
Figure 6:
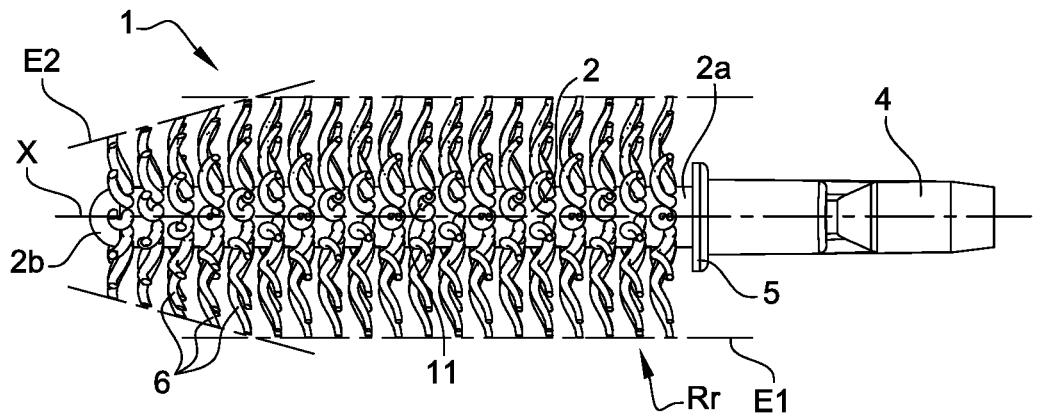
FIG. 6 is a side view of an applicator according to a second embodiment of the invention.
Figure 7:
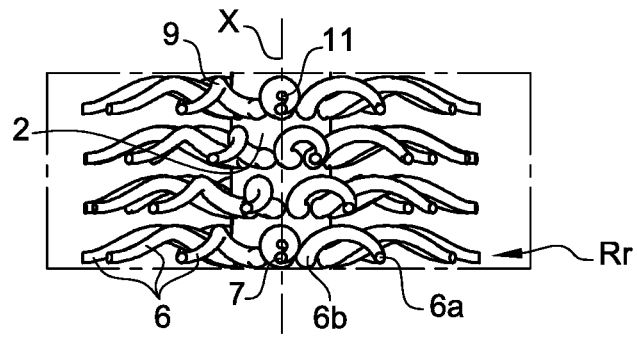
FIG. 7 is a detailed view of the protrusions of the applicator of FIG. 6.
Figure 8:
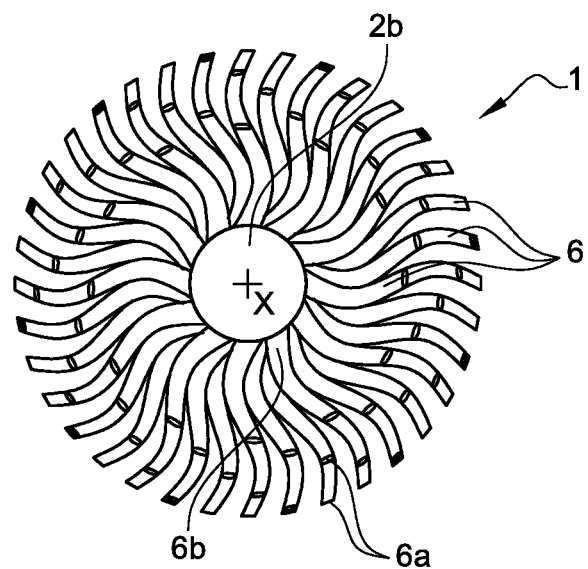
FIG. 8 is a top view of the applicator of FIG. 6.
Figure 9:
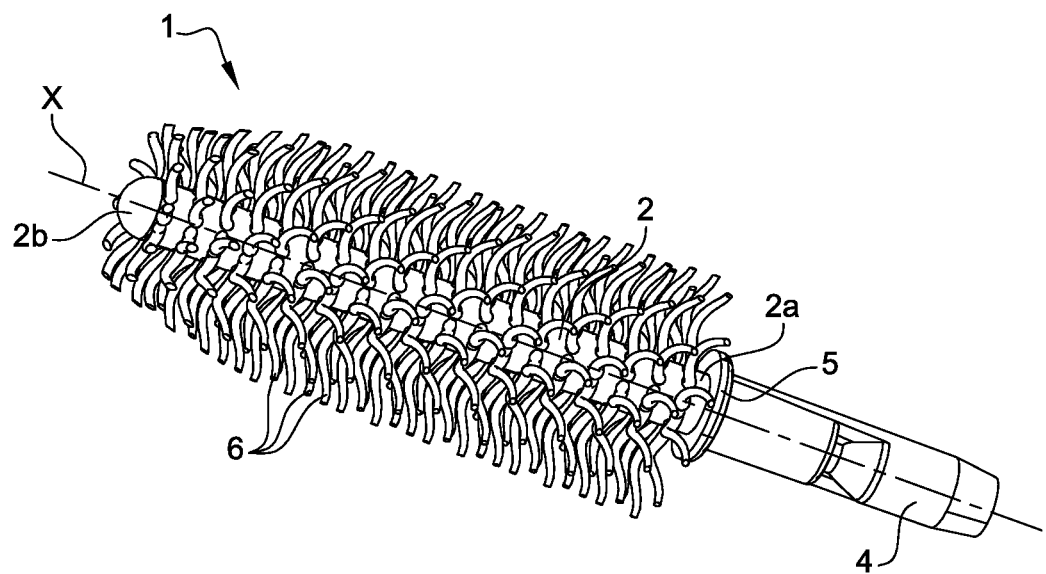
FIGS. 9 and 10 are perspective views of the applicator of FIG. 6.
Figure 10:
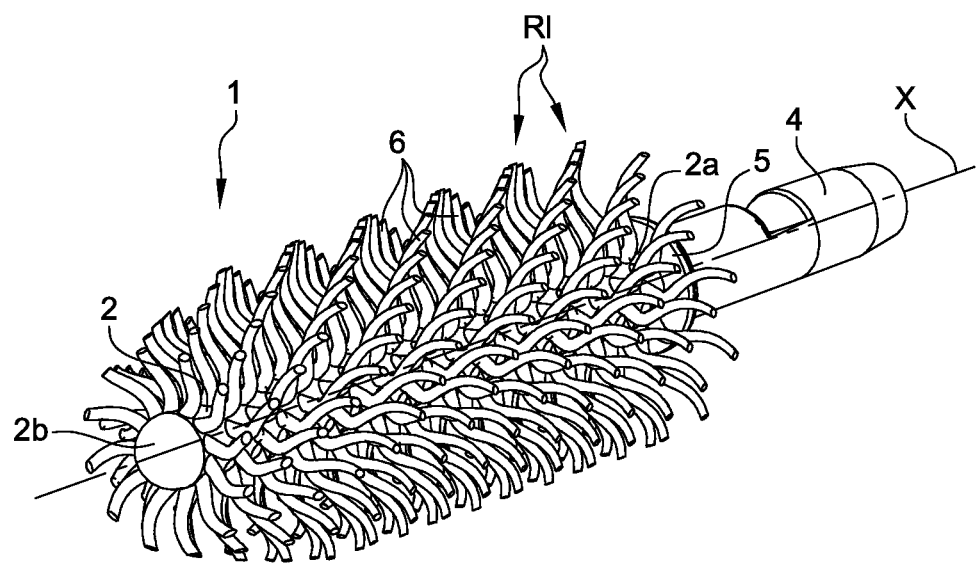

The term "height of the protrusion" is used to describe the height H measured from the radial periphery of the core 2 and the free distal end 6a of the protrusion (see FIG. 5). In other words, the term "height of the protrusions" describes the radial extension thereof measured from the base of the protrusion 6, projected on a plane that is orthogonal to the main axis X.

Thus, as represented in FIG. 5, the height H of the protrusions 6 is, for example, 4 mm.

The term "length of the protrusions" describes the distance L measured from the base of the protrusion 6, i.e. from the proximal end 6b to the free distal end 6a (see FIG. 5).

The term "the protrusions 6 protrude from the core 2 along a direction substantially perpendicular to the main direction X" describes the fact that the protrusions 6 protrude in a plane including the main direction X, and a direction radial to the direction X. In other words, the protrusions 6 can be at an angle, in the plane, towards the proximal and/or distal end, without departing from the scope of the invention.

The core 2 can be solid or hollow without moving away from the scope of the invention.

The core 2 here has a transversal cross-section with respect to the main direction X which is circular. In embodiments not represented, the core 2 can also have a polygonal transversal cross-section, such as triangular, or in quadrilateral shape, without moving away from the scope of the invention.

The core 2 is preferably of transversal cross-section, substantially constant from its first end 2a to its second end 2b, at least up to a flared portion which can possibly be present at the level of the second end 2b of the core 2.

As for the protrusions 6, they protrude from the core 2. They are arranged in a plurality of rows Rl, Rr that extend over the entire periphery of the core 2.

In the following description, a distinction is made between longitudinal rows Rl and radial rows Rr. The term "longitudinal row Rl of protrusions 6" means a row of protrusions 6, i.e. a succession of aligned or substantially aligned protrusions 6, arranged along the core 2, on one single line. The term "radial row Rr of protrusions 6" means a row of protrusions 6 arranged around the core 2, in a single plane that is orthogonal to the core 2, the plane intersecting with the core 2 along a direction that is, in this case, substantially circular.

The longitudinal rows Rl extend along the longitudinal direction X.

In the embodiments shown in FIGS. 2 to 5 and 11 to 14, the longitudinal rows Rl are parallel with the axis of main extension X.

In the embodiment shown in FIGS. 6 to 10 and 15, the longitudinal rows Rl present the characteristic of being at an angle with respect to the axis of main extension X. More specifically, the longitudinal rows Rl follow, in this case, substantially helicoidal lines, these lines being drawn on the surface of the core 2, from the first end 2a thereof to the second end 2b thereof. All the longitudinal rows Rl have the same slope and are parallel with one another.

The radial spacing between the longitudinal rows Rl about the periphery of the core 2 follows a constant angular distance a. The angular distance is in the range [0°; 90°]; it will therefore be around 30°.

The embodiments shown here have twelve longitudinal rows Rl, this number of longitudinal rows Rl being variable depending on the angular distance chosen between the longitudinal rows Rl.

In the embodiments shown in FIGS. 2 to 5 and 11 to 14, the protrusions 6 of two adjacent longitudinal rows Rl are axially aligned with respect to one another and form a radial row Rr. Two successive radial rows Rr include the same number of protrusions 6. The protrusions 6 of two successive radial rows Rr are also offset axially with respect to one another.

In the embodiments shown in FIGS. 6 to 10 and 15, the protrusions of two successive radial rows Rr are angularly offset, with respect to one another, along the axis of extension X. This angular offset makes it possible, here, to form helicoidal longitudinal rows Rl.

On the same axial portion, the rows have the same number of protrusions 6, with a tolerance of one protrusion more or fewer, for example nineteen protrusions 6. In other words, the rows Rl, Rr have substantially the same pitch between the protrusions 6 thereof.

Preferably, the protrusions 6 all have substantially one same height H. In other words, the distance between the radial periphery of the core 2 and the free end 6a of the protrusions 6 is substantially the same for all the protrusions 6 that includes the applicator 1. The protrusions 6 thus form a substantially cylindrical envelope.

However, the protrusions 6 called distal protrusions, i.e. the protrusions 6 which extend to the proximity of the second end 2b of the core 2 can have different heights H, so as to, for example, form an ogive-shaped envelope E2 as represented in FIGS. 2, 6, 11 and 13. The protrusions 6 which extend between the first end 2a of the core 2 and the distal protrusions 6 as for them form a substantially cylindrical envelope E1 (see also FIGS. 2, 6 11 and 13).

The ogive-shaped envelope facilitates, in particular, the insertion of the applicator 1 through the neck of the container containing the cosmetic product and the application of the cosmetic product at the level of the inner corner of the eye.

In a non-represented embodiment variant, the protrusions 6 can have a height H different from one row Rl, Rr to the other.

The free distal ends 6a of the protrusions 6 thus form an envelope of which the shape can vary without moving away from the scope of the invention. For example, the height H of the protrusions 6 can vary inside one same longitudinal and/or radial row Rl, Rr, from the first end 2a to the second end 2b of the core 2, to form envelopes at least partially substantially concave, convex, even envelopes having several peaks.

In the embodiments shown in FIGS. 11 to 15, the protrusions 6 have a transversal cross-section 7 whose dimension is constant from the proximal end 6b to the distal end 6a. The transversal cross-section 7 of a protrusion 6 is the cross-section made in a plane orthogonal to the longitudinal extension direction of the protrusion 6.

In the embodiments shown in FIGS. 2 to 10, the dimensions of the transversal cross-section 7 are greater to near the proximal end 6b than near the distal end 6a of the protrusion 6. In other words, the transversal cross-section 7 of the protrusion 6 has dimensions which increase from the proximal end 6b towards the distal end 6a.

According to the invention, at least some of the protrusions 6 have at least one helicoidal winding 9 on at least one portion of their length L, called helicoidal winding portion 9, i.e. over all or some of the length L of the protrusion 6.

By "helicoidal winding portion 9", this means a portion or section of the protrusion 6 which is wound in a helix around the elongation direction. This protrusion portion 6 has a generator which is non-linear, in particular helix-shaped.

In other words, some or all of the protuberances 6 are wound around the elongation direction along a curve of which a tangent at each point makes a constant angle with a given direction which is here the elongation direction.

The elongation direction is the direction from the base of the protuberance to its free end. It can be likened to an orthogonal axis or inclined relative to the main direction X. The axis can protrude from the core in a substantially normal direction relative to the main direction X, called radial direction or can protrude forming an angle with the main direction X different from 90°, i.e. an axis inclined towards one of the ends of the core.

Advantageously, the helicoidal winding 9 has at least one turn. This allows in particular to form a sufficient path so as to improve the wrap of the parts to make up and therefore a better distribution of the cosmetic product.

It is worth noting, that the term "length of the protrusions" describes the distance L measured from the base of the protrusion 6, i.e. from the proximal end 6b to the free distal end 6a or, in other words, it is the distance L measured along the helicoidal winding.

In the case of a protrusion 6 with a helicoidal winding portion 9, the height H of the protrusion 6 is different from the length thereof. The helicoidal winding 9 increases the length L of the protrusion 6. The length L of the protrusion is then greater than the height H thereof.

The helicoidal winding 9 makes it possible to form a path 11 wherein the cosmetic product can be stored. A reservoir of cosmetic product is thus formed.

In addition, the helicoidal winding 9 makes it possible to increase the length L of the protrusion 6 and thus create a flexibility effect during putting on make-up. Thus, more flexible protrusions 6 are obtained, making it possible to return the cosmetic product over the portion to have make-up put on, seamlessly. The user thus has an impression of softness when they put on make-up.

The flexibility of the protrusions also facilitates the entry and/or the exit of the applicator from the container.

Moreover, the helix shape of the protrusions makes it possible to best cover the portion to have make-up put on, in particular the eyelashes, and makes it possible for a better distribution of the cosmetic product. In the case of eyelashes, this makes it possible to increase their volume.

In the embodiments represented in the different figures, all the protrusions 6 have a helicoidal winding 9 extending over the whole length L.

In other embodiment variants not represented, the protrusions 6 can have a helicoidal winding 9 only over some of its length L. Preferably, the helicoidal winding portion 9 is situated on an outer portion of the protrusions 6, i.e. radially distal. In other words, the helicoidal winding portion 9 is situated between the middle of the length L and the free distal end 6a of the protrusion 6 or also beyond half in the direction of the free distal end 6a of the protrusion 6.

The helicoidal winding portion 9 can thus extend over at least ¼ of the length of the protrusions 6, even over at least ⅓, ½, ⅔, ¾, of the length of the protrusions 6.

It can also be considered, that the protrusions 6 have several helicoidal winding portions 9. The helicoidal winding portions 9 can, for example, be alternated with straight portions (not represented).

By "straight portion", this means a portion of the length of the protrusion 6 not having a helicoidal winding 9, in other words the generator of this portion is linear.

Furthermore, as shown in FIGS. 11 to 15, the protrusions 6 can include at least one groove 13.

The at least one groove 13 can extend over all or some of the length L of the protrusion 6. The groove 13 can extend over a protrusion portion 6 having a helicoidal winding 9 or over a straight portion. Thus, a grooved protrusion 6 or a grooved protrusion portion 6 is obtained.

The portions including at least one groove 13 can be alternated with smooth portions, i.e. protrusion portions 6 not including grooves 13.

The grooves 13 play the role of additional reservoir and thus make it possible for a larger storage of cosmetic product, in particular mascara.

Figure 11:
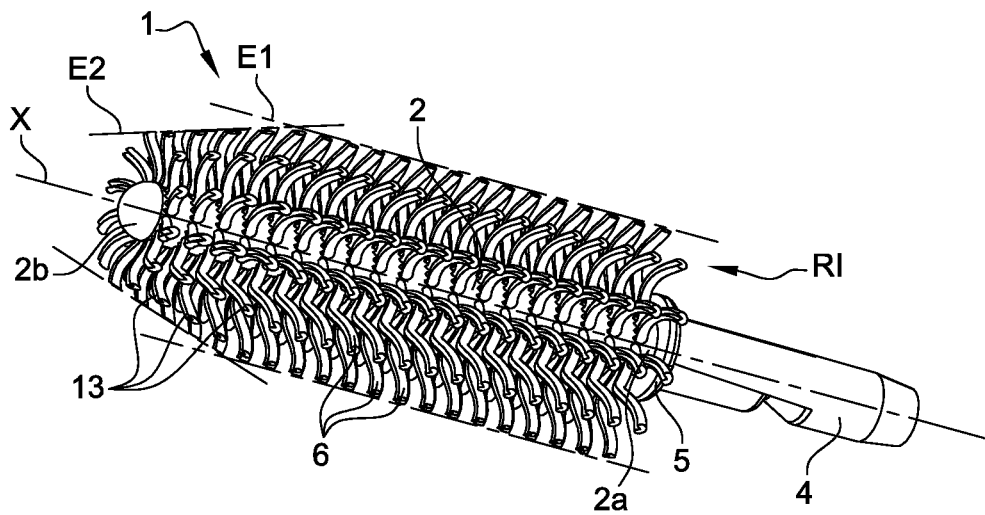
FIG. 11 is a perspective view of an applicator according to a third embodiment.
Figure 12:
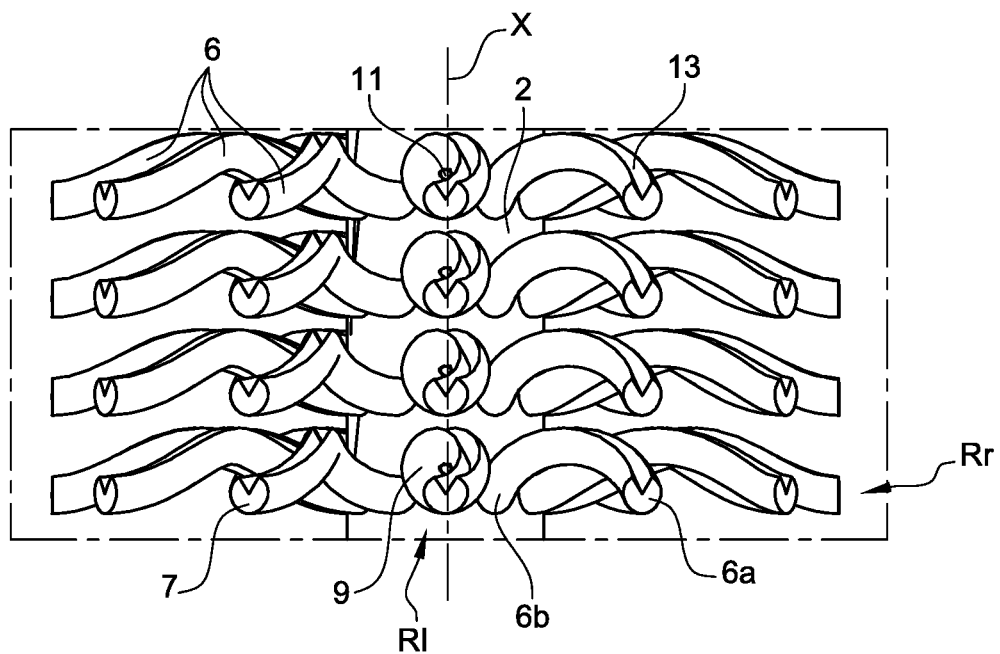
FIG. 12 is a detailed view of the protrusions of the applicator of FIG. 11.

As shown in FIGS. 11 and 12, the groove 13 can extend according to the profile of the protrusion 6.

Thus, over a straight portion, the groove 13 is straight.

In the case of a portion having a helicoidal winding 9, the groove 13 follows the helicoidal winding and extends parallel to this helicoidal winding 9 as this is represented in FIGS. 11 and 12.

Figure 13:
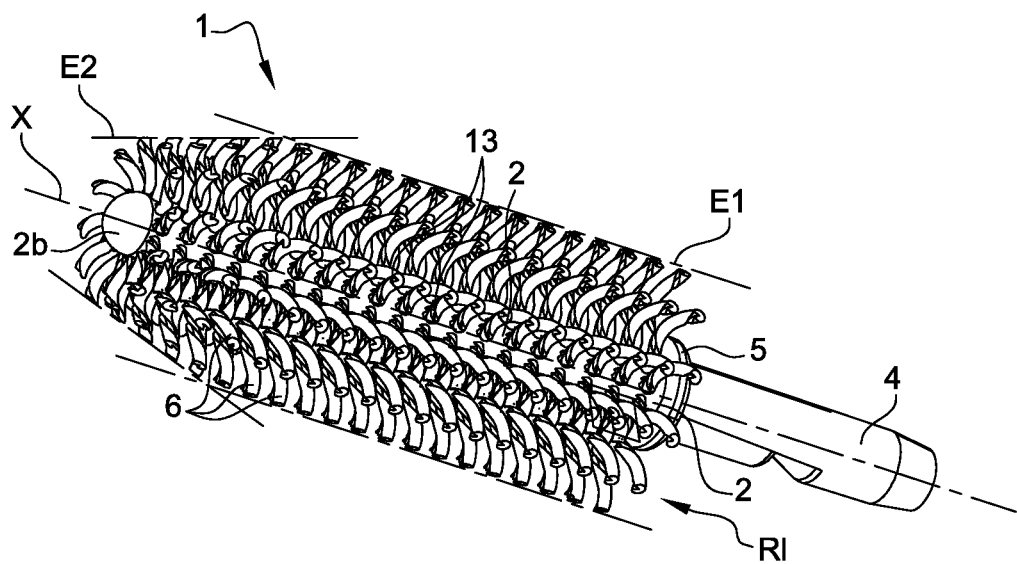
FIG. 13 is a perspective view of an applicator according to a fourth embodiment.
Figure 14:
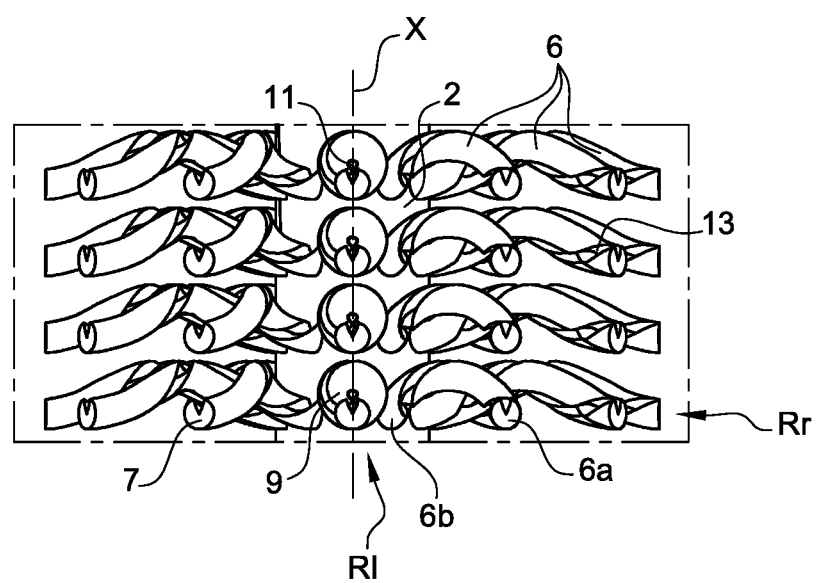
FIG. 14 is a detailed view of the protrusions of the applicator of FIG. 13.
Figure 15:
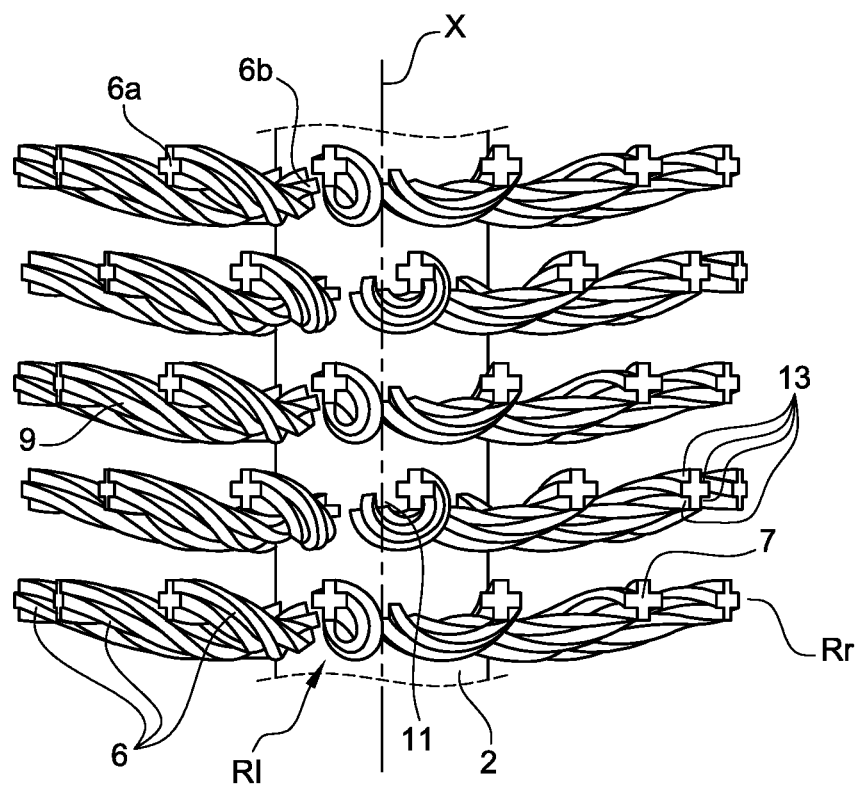
FIG. 15 is a side view of a part of an applicator according to a fifth embodiment of the invention.

As shown in FIGS. 13, 14 and 15, the groove 13 can also extend by winding around the protrusion 6. This winding gives a torsion effect to the protrusion. The protrusion appears spiraled on itself.

Thus, the applicator 1 includes at least one protrusion 6 including at least one of the following protrusion portions 6:

protrusion portions 6 having a helicoidal and smooth winding 9, protrusion portions 6 having a helicoidal and grooved winding 9.

Moreover, without moving away from the scope of the invention, the applicator 1 can also include at least one of the following protrusion portions 6:

straight and smooth protrusion portions 6, straight and grooved protrusion portions 6.

In the first embodiment illustrated in FIGS. 2 to 5, the applicator 1 includes protrusions 6 that protrude from the core 2 following the radial direction. These protrusions 6 are arranged in longitudinal rows Rl that are parallel with the axis of main extension X. The protrusions 6 located towards the second end 2b of the core 2 are varying heights H so as to form an ogive-shaped envelope E2. As for the remainder of the protrusions 6, they have the same height H and form a substantially cylindrical envelope E1. The protrusions 6 furthermore have a transversal cross-section 7 that decreases in size from the proximal end 6b to the distal end 6a. In this embodiment, the protrusions 6 have a smooth helicoidal winding 9.

In the second embodiment illustrated in FIGS. 6 to 10, the applicator 1 includes protrusions 6 that protrude from the core 2 following the radial direction. These protrusions 6 are arranged in substantially helicoidal longitudinal rows Rl. The protrusions 6 located towards the second end 2b of the core 2 are varying heights H so as to form an ogive-shaped envelope E2. As for the remainder of the protrusions 6, they have the same height H and form a substantially cylindrical envelope E1. The protrusions 6 furthermore have a transversal cross-section 7 that decreases in size from the proximal end 6b to the distal end 6a. In this embodiment, the protrusions 6 have a smooth helicoidal winding 9.

In the third embodiment illustrated in FIGS. 11 to 12, the applicator 1 includes protrusions 6 that protrude from the core 2 following the radial direction. These protrusions 6 are arranged in longitudinal rows Rl that are parallel to the axis of main extension X. The protrusions 6 located towards the second end 2b have varying heights H so as to form an ogive-shaped envelope E2. As for the remainder of the protrusions 6, they have the same height H and form a substantially cylindrical envelope E1. The protrusions 6 furthermore have a transversal cross-section 7 that is constant in size from the proximal end 6b to the distal end 6a. In this embodiment, the protrusions 6 have a helicoidal winding 9 including a groove 13 that extends over the entire length of the protrusion 6 and that follows the helicoidal winding 9.

In the fourth embodiment illustrated in FIGS. 13 to 14, the applicator 1 includes protrusions 6 that protrude from the core 2 following the radial direction. These protrusions 6 are arranged in longitudinal rows Rl that are parallel with the axis of main extension X. The protrusions 6 located towards the second end 2b of the core 2 are varying heights H so as to form an ogive-shaped envelope E2. As for the remainder of the protrusions 6, they are the same height H and form a substantially cylindrical envelope E1. The protrusions 6 further have a transversal cross-section 7 that is constant in size from the proximal end 6b to the distal end 6a. In this embodiment, the protrusions 6 have a helicoidal winding 9 including a groove 13 that extends over the entire length of the protrusion 6 and that winds itself around the protrusion 6.

In the fifth embodiment illustrated in FIG. 15, the applicator 1 includes protrusions 6 that protrude from the core 2 following the radial direction. These protrusions 6 shown are arranged in substantially helicoidal longitudinal rows Rl. The shown protrusions 6 have a same height H so as to form a substantially cylindrical envelope E1. The protrusions 6 furthermore have a transversal cross-section 7 that is constant in size from the proximal end 6b to the distal end 6a. In this embodiment, the protrusions 6 have a helicoidal winding 9 including four grooves 13 that extend over the entire length of the protrusion 6 and that wind themselves around the protrusion 6. The four grooves 13 are evenly distributed around the protrusion 6. This provides protrusions 6 with a transversal cross-section 7 in the shape of a cross.

Any other transversal cross-section shape 7 can be considered. The shape of the transversal cross-section 7 of the protrusions 6 is, in particular, determined by the number of grooves 13 have on the protrusion 6. According to the profile of the protrusion 6, the shape of the transversal cross-section 7 can vary along the length of the protrusion 6.

Advantageously, each of the nonlinear protuberances 6 have a similar general profile, i.e., for example, a same number of turn(s), an uniform disposition, a same orientation with respect to the main direction X, a same cross section.

It must also be noted, that the applicator 1 advantageously forms a brush.

Preferably, the applicator 1 described above is obtained by an additive manufacturing method.

By additive manufacturing or additive synthesis method, this means a method of manufacturing by adding material, generally computer-assisted material. Such a manufacturing method is also called three-dimensional printing or also 3D printing.

Using three-dimensional printing to manufacture the applicator 1 makes it possible to produce a core 2 and protrusions 6 with original and complex shapes which could prove to be very complex, or even impossible, to obtain by a conventional injection moulding method. It is thus possible to produce, directly and by one unique manufacturing operation, the complex shape which will give its characteristics to the protrusion. In addition, this technique makes it possible to avoid using complex moulds.

Different additive manufacturing technologies known to a person skilled in the art can be used. In particular, this can be:

fused deposition modelling (FDM), selective laser melting (SLM), selective laser sintering (SLS), electron beam melting (EBM), stereolithography or photo-polymerisation (SLA for "Stereolithography Apparatus"), or laminated object manufacturing (LOM).

Preferably, these are sintering and/or stereolithographic technologies.

The invention also concerns a method for manufacturing an applicator 1 such as described above. The method includes:

a step of developing a digital model of the applicator 1;

a step of manufacturing the applicator 1 by means of the digital model.

The digital model is a computerised file which corresponds to a virtual model of the applicator 1. To obtain it, the applicator 1 is first modelled so as to obtain a CAD model which is then converted into a suitable format, such as an .STL file. The file is then exploited on an additive manufacturing machine. During its reading, the digital model is split into a certain number of layers according to the desired precision. Preferably, the layers correspond to a transversal cross-section 7 of the applicator 1, i.e. a cross-section of the applicator 1 taken in a plane perpendicular to the main direction X.

The suitable materials to manufacture the core 2 and the protrusions 6 by three-dimensional printing are polyamides, photosensitive resins, polylactic acid (PLA), acrylonitrile butadiene styrene (ABS).

The invention also concerns an applicator unit 15 for cosmetic product, including a container 17 including a body forming a reservoir intended to contain the cosmetic product (not represented), and an applicator 1, such as described above, adapted to be fixed on the container 17, such that the applicator 1 is housed inside the reservoir. The applicator 1 is fixed, for example, to a proximal end 3a of the rod 3, itself fixed to a stopper 19 advantageously screwed to the container 17.

It must be noted, that after mounting, the sleeve 4 is situated in the rod 3 and the first (proximal) end 2a of the core 2 corresponds to the distal end 3b of the rod.

Furthermore, to avoid the applicator 1 being too loaded with cosmetic product, the container 17 can include a wiper 21, fixed inside the neck. When the user removes the applicator 1 from the container 17, the applicator 1 slides inside the wiper 21. The wiper 21 scrapes the excess cosmetic product on the rod 3 and on the applicator 1.

The wiper 21 thus makes it possible to adjust the quantity of product have on the applicator 1 and avoids an excessive application of cosmetic product on the eyelashes.

Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. An applicator for a cosmetic product, comprising:

a core extending along a main direction comprising a longitudinal extension direction, and a plurality of protrusions integral with the core, the protrusions extending from a proximal end connected to the core to a free distal end along a elongation direction so as to define a length, wherein at least some of the protrusions have at least one helicoidal winding on at least a portion of a helicoidal winding portion comprising a length of the at least some of the protrusions, the helicoidal winding portion being wound in a helix around the elongation direction forming a path wherein the cosmetic product can be stored.

2. The applicator according to claim 1, wherein said at least one helicoidal winding is located on a radially distal portion of the protrusions.

3. The applicator according to claim 1, wherein said at least one helicoidal winding extends over a whole length of the at least some of the protrusions.

4. The applicator according to claim 1, wherein the protrusions each comprise at least one groove.

5. The applicator according to claim 4, wherein the at least one groove of a corresponding one of the protrusions extends parallel to said at least one helicoidal winding and/or by winding around the corresponding one of the protrusions.

6. The applicator according to claim 1, wherein the protrusions are arranged in the form of longitudinal rows, the rows being substantially parallel with the main direction.

7. The applicator according to claim 1, wherein the protrusions are arranged in the form of longitudinal rows, the rows winding themselves helicoidally around the core.

8. The applicator according to claim 1, wherein the applicator is obtained by additive manufacturing.

9. An applicator unit for cosmetic product, comprising:

a container comprising a body forming a reservoir intended to contain the cosmetic product, and an applicator for a cosmetic adapted to be secured to the container, such that the applicator is housed inside the reservoir, the applicator comprising:

a core extending along a main direction comprising a longitudinal extension direction, and a plurality of protrusions integral with the core, the protrusions extending from a proximal end connected to the core to a free distal end along a elongation direction so as to define a length, wherein at least some of the protrusions have at least one helicoidal winding on at least a portion of a helicoidal winding portion comprising a length of the at least some of the protrusions, the helicoidal winding portion being wound in a helix around the elongation direction forming a path wherein the cosmetic product can be stored.

\* \* \* \* \*